United States Patent [19]

Tokumoto

[11] Patent Number: 5,532,818
[45] Date of Patent: Jul. 2, 1996

[54] DIFFERENCE DISPERSIVE DOUBLE-PATH MONOCHROMATOR HAVING WAVELENGTH-INDEPENDENT IMAGING POINT

[75] Inventor: Isao Tokumoto, Gyoda, Japan

[73] Assignee: Advantest Corporation, Japan

[21] Appl. No.: 361,369

[22] Filed: Dec. 22, 1994

[30] Foreign Application Priority Data

Dec. 27, 1993 [JP] Japan .................. 5-074481 U

[51] Int. Cl.[6] ........................................ G01J 3/18
[52] U.S. Cl. .............................. 356/333; 356/328
[58] Field of Search ........................... 356/319, 328, 356/332, 333

[56] References Cited

U.S. PATENT DOCUMENTS

5,233,405 8/1993 Wildnauer et al. ................ 356/333

Primary Examiner—Vincent P. McGraw
Attorney, Agent, or Firm—Staas & Halsey

[57] ABSTRACT

Incoming light is reflected by a first parabolic mirror for incidence as parallel rays of light on a diffraction grating, the reflected light therefrom is incident on a second parabolic mirror, and the reflected light therefrom is bent by first and second reflecting mirror in a vertical direction and reflected back to the second parabolic mirror, from which it is reflected to the diffraction grating. The reflected light from the grating is reflected again by the first parabolic mirror for incidence on a photodetector. An optical glass plate is inserted in the optical path between the second reflecting mirror and the second parabolic mirror. By the passage through the optical glass plate, the optical axis in a horizontal plane is displaced to ensure the incidence of light from the first parabolic mirror on the photodetector regardless of the wavelength of the incoming light to be measured.

11 Claims, 8 Drawing Sheets

DIFFERENCE DISPERSIVE DOUBLE-PATH MONOCHROMATOR HAVING WAVELENGTH-INDEPENDENT IMAGING POINT

BACKGROUND OF THE INVENTION

The present invention relates to a difference dispersive double-path monochromator which measures the wavelength of incoming light after incidence on a diffraction grating before and after reflection by a reflecting mirror.

Figure 1:
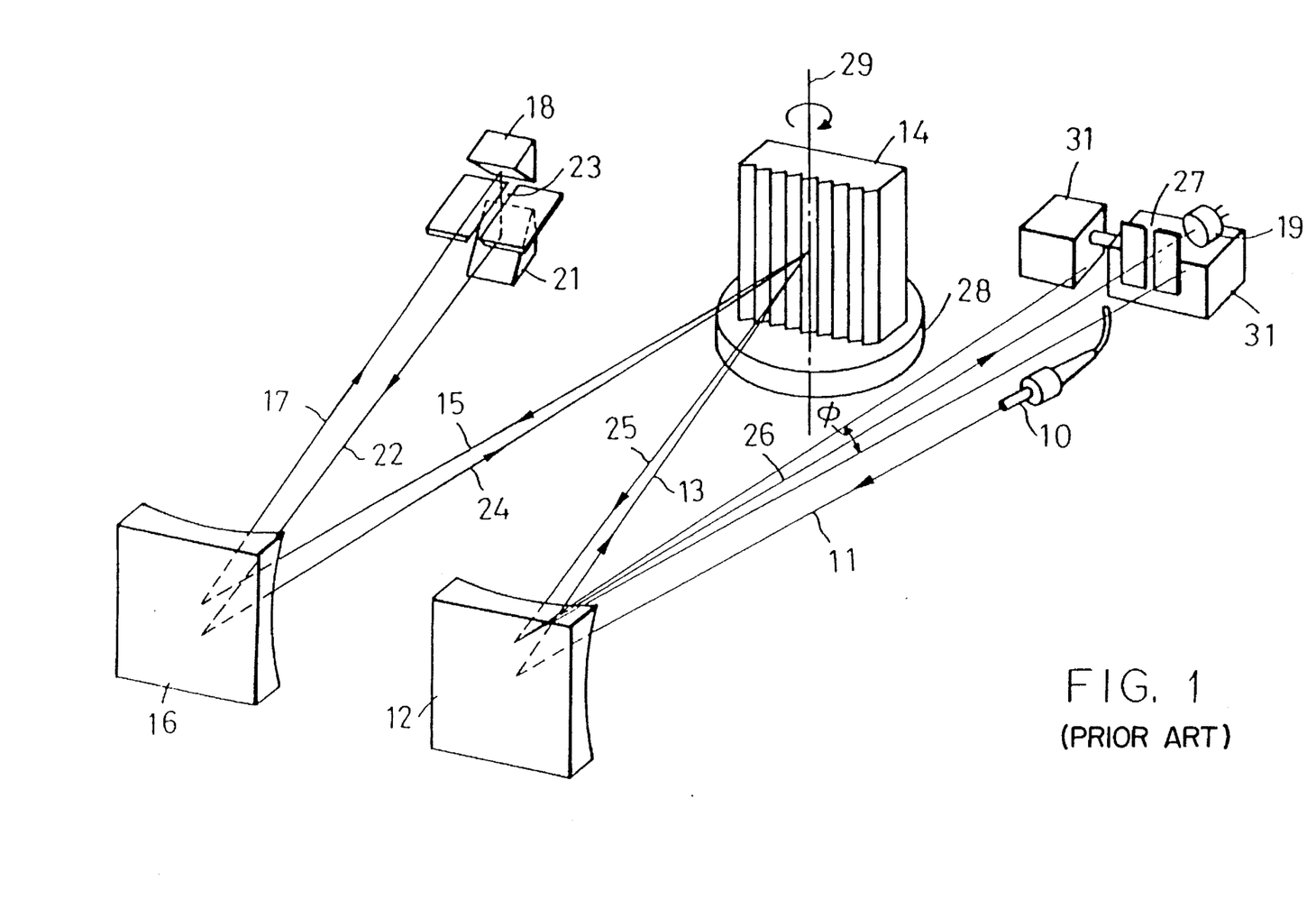
FIG. 1 is a diagrammatic showing of a conventional double-path monochromator.

FIG. 1 is a diagram schematically showing the basic concept of a conventional difference dispersive double-path monochromator.

For example, incoming light 11 from an optical fiber 10 is collimated by a parabolic mirror 12 and the collimated light beam 13 strikes on a diffraction grating 14. The collimated light beam 13 thus incident on the diffraction grating 14 is diverged into rays of light 15, which are reflected from the grating 14 at different angles according to wavelength. The rays of light 15 impinge on a second parabolic mirror 16, by which they are converged and reflected as light 17 to a plane reflecting mirror 18. Incidentally, since it is necessary that the optical fiber 10 for introducing the incoming light and a photodetector 19 for receiving outgoing light which returns after having impinged on the diffraction grating 14 twice be physically spaced apart in the Z-axis direction, that is, in the direction of grooves of the diffraction grating 14, the optical axis of the return path is adjusted accordingly. On this account, the light 17 incident on the reflecting mirror 18 is reflected in the Z-axis direction and then reflected by a plane reflecting mirror 21 back to the second parabolic mirror 16 in parallel with the reflected light 17 as indicated by 22. The light beams 17 and 22 are spaced, for example, about 5 mm apart. The focus of the second parabolic mirror 16 is positioned at a point intermediate between reflection points of the reflecting mirrors 18 and 21. A slit 23 is provided at a point intermediate between the reflecting mirrors 18 and 21 to limit the beam diameter of the light which is reflected from the former to the latter. The width of the slit 23 is variable in accordance with the bandwidth of the wavelength to be measured.

The light 22 reflected back to the second parabolic mirror 16 is reflected as a collimated light beam 24 back to the diffraction grating 14; rays of light 24 reflected from the grating 14 are again reflected by the first parabolic mirror 12, then the reflected light 26 therefrom is converged and the component of the wavelength desired to measure is allowed to pass through a slit 27 for incidence on the photodetector 19 for conversion to an electric signal.

Figure 2A:
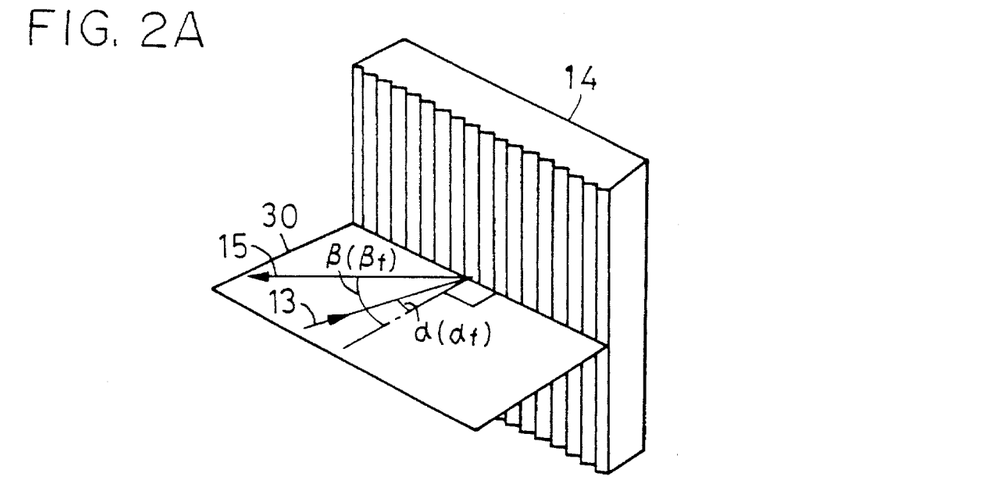
FIG. 2A is a diagram schematically showing the relationship between incident light on and reflected light from a diffraction grating when forward light incident thereon in parallel with a plane perpendicular to its axis of rotation.

With the above structure in which the return path from the reflecting mirror 21 to the photodetector 19 via the diffraction grating 14 is shifted in the Z-axis direction with respect to the path of the incident light 11 from the optical fiber 10 to the reflecting mirror 18 via the diffraction grating 14, even if the incident light 15 to the second parabolic mirror 16 from the diffraction grating 14 and the reflected light 17 stays in a plane perpendicular to the axis of rotation 29 of the diffraction grating 14 (which plane will hereinafter referred to as a main cross-sectional profile), the point of incidence of the light 22 to the second parabolic mirror 16 from the reflecting mirror 21 is displaced in the Z-axis direction relative to the point of incidence of the light 15 to the second parabolic mirror 16 from the diffraction grating 14, and consequently, the reflected light 24 from the parabolic mirror 16 goes out of the above-mentioned main cross-sectional profile and strikes on the diffraction grating 14 at a certain angle θ to the main cross-sectional profile 30. That is, the angle of incidence on the diffraction grating 14 on the return path is the angle θ to a plane 30 perpendicular to the grating grooves of the diffraction grating 14 as shown in FIG. 2A; hence, the relationship between the angles of incidence and reflection from the diffraction grating 14 differ with the paths to and from the reflecting mirrors 18 and 23. In other words, the wavelength λ in the diffraction grating 14, the order m of the diffracted light, the grating groove spacing d, the incidence angle α and the reflection angle β bear the following relationship when the light 13 is incident in the plane (the main cross-sectional profile) 30 perpendicular to the grating grooves of the diffraction grating 14 as shown in FIG. 2A.

$$m\lambda = d(\sin\alpha + \sin\beta) \tag{1}$$

Figure 2B:
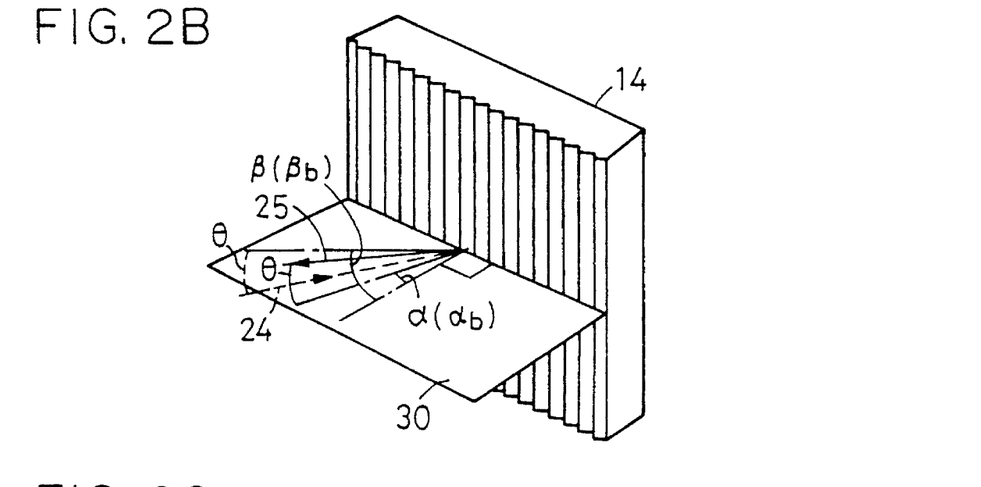
FIG. 2B is a diagram schematically showing the relationship between incident light to and reflected light from the diffraction grating when the corresponding backward light is incident thereon at an angle to the plane perpendicular to its axis of rotation.

This relationship is used to measure the wavelength of the incoming light. When light is incident on the diffraction grating 14 at the angle θ to the main cross-sectional profile 30 as shown in FIG. 2B, the relationship of Eq. (1) becomes as follows:

$$m\lambda = d(\cos\theta\sin\alpha + \cos\theta\sin\beta) \tag{2}$$

Thus, when sweeping the wavelength to be measured by turning the diffraction grating 14 about the axis 29 parallel to the grating grooves, the direction of the reflected light 26 from the first parabolic mirror 12 changes with wavelength as indicated by an angle φ. To comply with this, the conventional double-path monochromator has, as disclosed in U.S. Pat. application No. 788,444 (filed Nov. 6, 1991, now U.S. Pat. No. 5,233,405, or Japanese Pat. Laid Application Open Gazette No. 212025/92), for instance, a drive mechanism 31 which moves the slit 27 and the photodetector 19 in ganged relation to the turning of the diffraction grating 14 to always hold the photodetector 19 at the position of the imaging point of the reflected light 26 which differs with wavelength. The drive mechanism 31 is commonly referred to as a tracking mechanism and is required to bring the photodetector 19 to a position precisely corresponding to the rotational position of the diffraction grating 14.

A description will be given further of the problem that the imaging point of the reflected light 26 on the return path shifts in accordance with the wavelength to be measured. Letting the angle of incidence of forward light on the diffraction grating 14, The angle of reflection therefrom. The angle of incidence of backward light on the diffraction grating 14 and the angle of reflection therefrom be represented by $\alpha_f$, $\beta_f$, $\beta_b$ and $\alpha_b$, respectively, Eqs. (1) and (2) hold true for the forward light and backward light and they bear the relationships expressed as follows:

$$m\lambda = d(\sin\alpha_f + \sin\beta_f) \tag{3}$$

$$m\lambda = d\cos\theta(\sin\alpha_b + \sin\beta_b) \tag{4}$$

When the angle of reflection $\beta_f$ of the forward light and the angle of incidence $\beta_b$ of the backward light are the same, setting $\sin\beta_f = \sin\beta_b = K$, the difference between the angle of incidence $\alpha_f$ on the diffraction grating 14 on the forward path and the angle of reflection $\alpha_b$ from the diffraction grating 14 on the backward or return path is such as given by Eq. (5).

$$\alpha_f - \alpha_b = \sin^{-1}\left(\frac{m\lambda}{d} - K\right) - \sin^{-1}\left(\frac{m\lambda}{d\cos\theta} - K\right) \tag{5}$$

Eq. (5) contains elements of the wavelength λ this means that the imaging point of the reflected light 26 moves in accordance with wavelength. On account of this movement of the imaging point, it is necessary in the prior art to bring the photodetector to the position corresponding to the wavelength to be measured, by the aforementioned tracking mechanism 31 or the like. Moreover, the position to which the photodetector 19 is moved by the tracking mechanism 31 must be predetermined for each wavelength; it is therefore necessary, for each equipment, to detect the imaging point of the reflected light 26 for a reference wavelength and prestore the detected value in a memory table or the like.

It is therefore an object of the present invention to provide a difference dispersive double-path monochromator which has an optical configuration that eliminates the movement itself of the imaging point on the return path and consequently precludes the necessity of the tracking mechanism, and hence permits reduction of the manufacturing costs of the monochromator itself and always provides high accuracy.

SUMMARY OF THE INVENTION

According to a first aspect of the present invention, in a double-path monochromator wherein incoming light is reflected by first parabolic mirror means into parallel rays for incidence to a diffraction grating, the reflected light therefrom is reflected and condensed by second parabolic mirror means into a light beam for incidence to a first reflecting mirror, the light reflected from the second parabolic mirror means is displaced by the first and second reflecting mirrors in parallel with the axis of rotation of the diffraction grating and reflected back to the second parabolic mirror means, the light reflected back thereto is reflected therefrom as parallel rays for incidence to the diffraction grating, and the light reflected therefrom is reflected and converged or condensed by the first parabolic mirror means for incidence to a photodetector, at least one of the first and second reflecting mirrors is disposed so that light is bent a predetermined angle also in a plane perpendicular to the axis of rotation of the diffraction grating.

According to a second aspect of the present invention, light is not bent by either of the first and second reflecting mirrors in the above-mentioned plane, but instead an optical glass plate is disposed on either one of forward and backward optical paths between the second parabolic mirror means and the first and second reflecting mirrors. The light incident to or reflected from the second reflecting mirror is refracted by the optical glass when passing therethrough so that its optical axis is displaced a predetermined angle in parallel with the axis of rotation of the diffraction grating in a plane perpendicular thereto.

The optical glass plate is one that its thickness in the direction of the passage therethrough of light is uniform or gradually varies.

According to both of the first and second aspects of the present invention, the difference between the angle of incidence of light on the diffraction grating from the second parabolic mirror means and the angle of reflection of light from the diffraction grating back to the first parabolic mirror means is held at a predetermined value regardless of the wavelength of the incoming light to be measured.

According to either of the first and second aspects of the present invention, the first and second parabolic mirror means may sometimes be formed by a single parabolic mirror.

The parabolic mirrors may be substituted with a collimator lens. That is, the incoming light to be measured is collimated by the collimator lens into forward parallel rays for incidence on the diffraction grating, the forward reflected light therefrom is converged by the collimator lens for incidence to the first reflecting mirror, by which it is bent in parallel with the axis of rotation of the diffraction grating; the thus bent light is reflected by the second reflecting mirror back to the collimator lens, by which it is collimated into backward parallel rays for incidence on the diffraction grating and the light reflected therefrom is converged by the collimator lens for incidence on the photodetector. In such a double-path monochromator, too, it is possible to employ the configuration in which the optical axis of the incoming light is displaced a predetermined angle by the first and second reflecting mirrors in the plane perpendicular to the axis of rotation of the diffraction grating or the configuration in which the direction of travel of the incoming light is displaced by the optical glass plate.

BRIEF DESCRIPTION OF THE DRAWINGS

FIG. 5B is a diagram showing displacement of an optical axis by an optical glass 34 in the FIG. 4 embodiment;

FIGS. 5C and D are perspective views showing other examples of optical glass for use in the FIG. 4 embodiment;

DESCRIPTION OF THE PREFERRED EMBODIMENTS

Figures 3A, 3B:
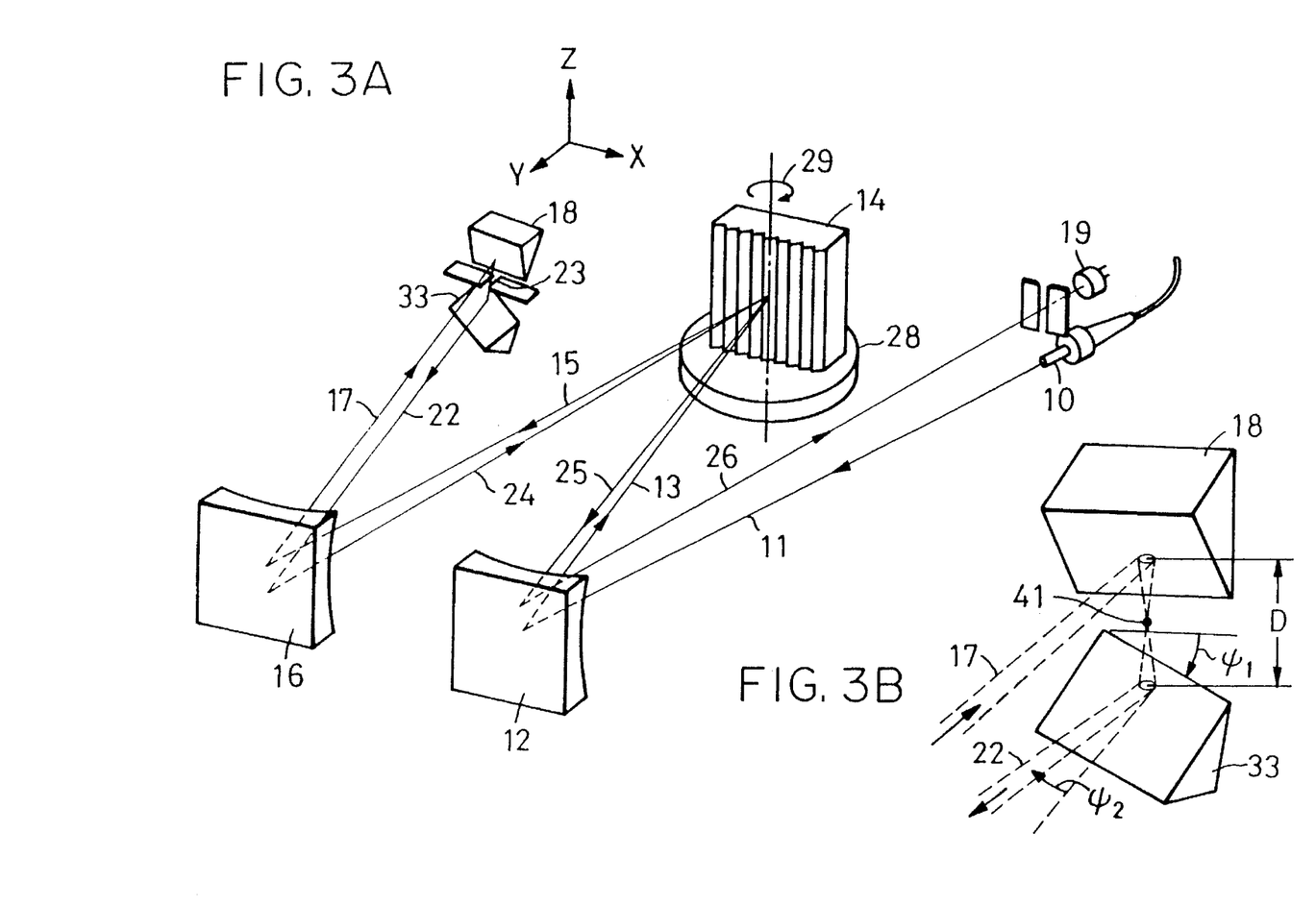
FIG. 3A is a diagrammatic representation of an embodiment according to the first aspect of the present invention.
FIG. 3B is an enlarged perspective view of the principal part for reflecting the forward light back to the return path.

FIG. 3A illustrates an embodiment of the present invention, in which the parts corresponding to those in FIG. 1 are identified by the same reference numerals. In the prior art example of FIG. 1 the reflecting mirror 21 is held in parallel with the reflecting mirror 18 in the X-axis direction (a direction perpendicular to both of the Z axis and the incident light 17), but in the present invention, the reflecting mirror 21 is substituted with a plane reflecting mirror 21 which is disposed at an angle different from that of the reflecting mirror 21 in the X-axis direction. That is, as shown in FIG. 3B, the reflecting mirror 33 is shifted by an angle $\Psi_1$ relative to the reflecting mirror 18 in the X-axis direction. The distance D between the points of reflection of the reflecting mirrors 18 and 33 is the same as in the case of the FIG. 1 prior art example. With this arrangement, the reflected light 22 from the reflecting mirror 33 is displaced by an angle $\Psi_2$ in the X-Y plane from the reflected light 22 in FIG. 1 and the incidence angle $\beta_b$ on the diffraction grating 14 on the return path changes accordingly, allowing the reflected light 26 from the grating 14 to strike on the imaging point at a wavelength-independent position at all times. This avoids the necessity of moving the photodetector 19 and hence eliminates the need for the tracking mechanism 31.

Next, a description will be given of the condition that precludes the necessity of the tracking mechanism 31, that is, always holds the imaging point of the reflected light 26 at a fixed position unrelated to wavelength. Rewriting Eqs. (3) and (4) with $\gamma_f = \beta_b - \alpha_f$ and $\gamma_b = \beta_b - \alpha_b$, we have $$\frac{m\lambda}{2d\cos(\gamma_f/2)} = \sin\left(\alpha_f + \frac{\gamma_f}{2}\right)$$

$$\frac{m\lambda}{2d\cos\cos(\gamma_b/2)} = \sin\left(\alpha_b + \frac{\gamma_b}{2}\right)$$

From the above, we have the forward light incidence angle $\alpha_f$ and the backward light reflection angle $\alpha_b$ as follows:

$$\alpha_f = \sin^{-1}\left\{\frac{m\lambda}{2d\cos(\gamma_f/2)}\right\} - \frac{\gamma_f}{2} \tag{6}$$

$$\alpha_b = \sin\left\{\frac{m\lambda}{2d\cos\theta\cos(\gamma_b/2)}\right\} - \frac{\gamma_b}{2} \tag{7}$$

By turning the diffraction grating 14 in accordance with a change in the wavelength $\lambda$ of the incoming light 11, that is, by changing the reflection angle $\alpha_b$ equally with the incidence angle $\alpha_f$, the imaging point of the reflected light 26 will remain unchanged. Hence, when the incidence angle $\alpha_f$ and the reflection angle $\alpha_b$ have the same rate of change to a change in the wavelength $\lambda$, that is, when $\partial \alpha_f/\partial \lambda = \partial \alpha_b/\partial \lambda$, the incidence angle $\alpha_f$ changes with the wavelength $\lambda$ and the imaging point of the outgoing light 26 becomes fixed. Therefore, setting Eqs. (6) and (7) equal by differentiating them with $\lambda$, we have $$\cos(\gamma_f/2) = \cos\theta \cos(\gamma_b/2) \tag{8}$$

obtained Eq. (9) from Eq. (8)

$$\gamma_b = 2\cos^{-1}\left\{\frac{\cos(\gamma_f/2)}{\cos\theta}\right\} \tag{9}$$

and substituting it in Eq. (7), we have $$\alpha_b = \sin^{-1}\left\{\frac{m\lambda}{2d\cos(\gamma_f/2)}\right\} - \cos^{-1}\left\{\frac{\cos(\gamma_f/2)}{\cos\theta}\right\} \tag{10}$$

From Eqs. (6) and (10) we obtain the equation as follows:

$$\alpha_f - \alpha_b = \frac{-\gamma_f}{2} + \cos^{-1}\left\{\frac{\cos(\gamma_f/2)}{\cos\theta}\right\} \tag{11}$$

From the relationships $\gamma_f = \beta_f - \alpha_f$, $\gamma_b = \beta_b - \alpha_b$ and Eqs. (9) and (11), we obtain the equation as follows:

$$\beta_f - \beta_b = \frac{-\gamma_f}{2} + \cos^{-1}\left\{\frac{\cos(\gamma_f/2)}{\cos\theta}\right\} \tag{12}$$

Figure 2C:
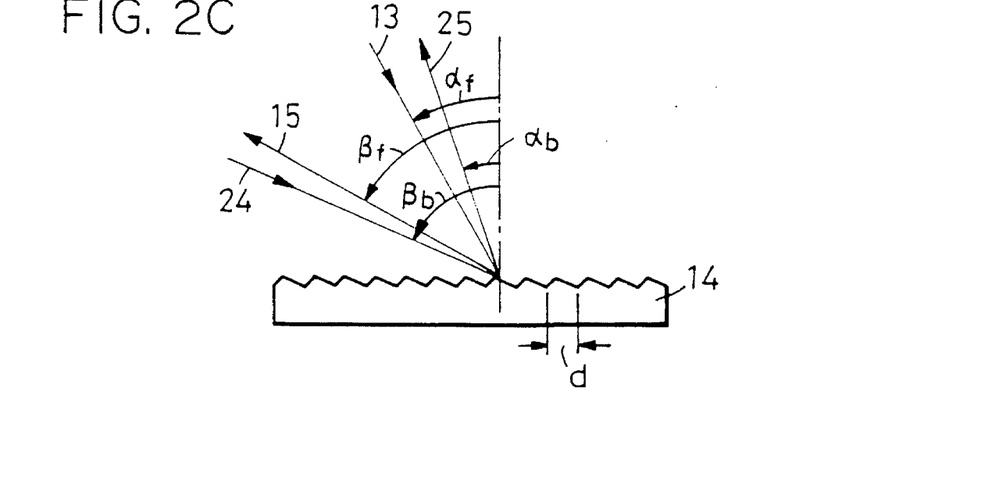
FIG. 2C is a diagram schematically showing the angles of incidence and reflection of the forward and the backward light to the diffraction grating.

Eqs. (11) and (12) respectively become the same constant. Therefore, the displacement angle $\Psi_2$ shown in FIG. 2 needs only to take the constant value of Eq. (12).

In the above the reflecting mirror 18 is held intact at the position shown in FIG. 1 and the reflecting mirror 21 is slanted with respect to the X-axis direction, but conversely the former may also be disposed aslant relative to the X-axis direction. Alternatively, the light 22 returning to the second parabolic mirror 16 may be made oblique a predetermined angle to the X-axis direction by using both of the reflecting mirrors 18 and 21. In either case, the reflecting mirror (33 in FIG. 3) slanted relative to the X-axis direction is oblique to the direction of incidence thereon; hence, polarization of the incident light turns or rotates. To eliminate the polarization dependence of the diffraction grating 14 for both of the forward and the backward light through use of one Savart plate, a change in the polarization by the reflecting mirror 33 needs to be made symmetrical. That is, vertically polarized light must be reflected with the direction of its polarization held vertical.

Figure 4:
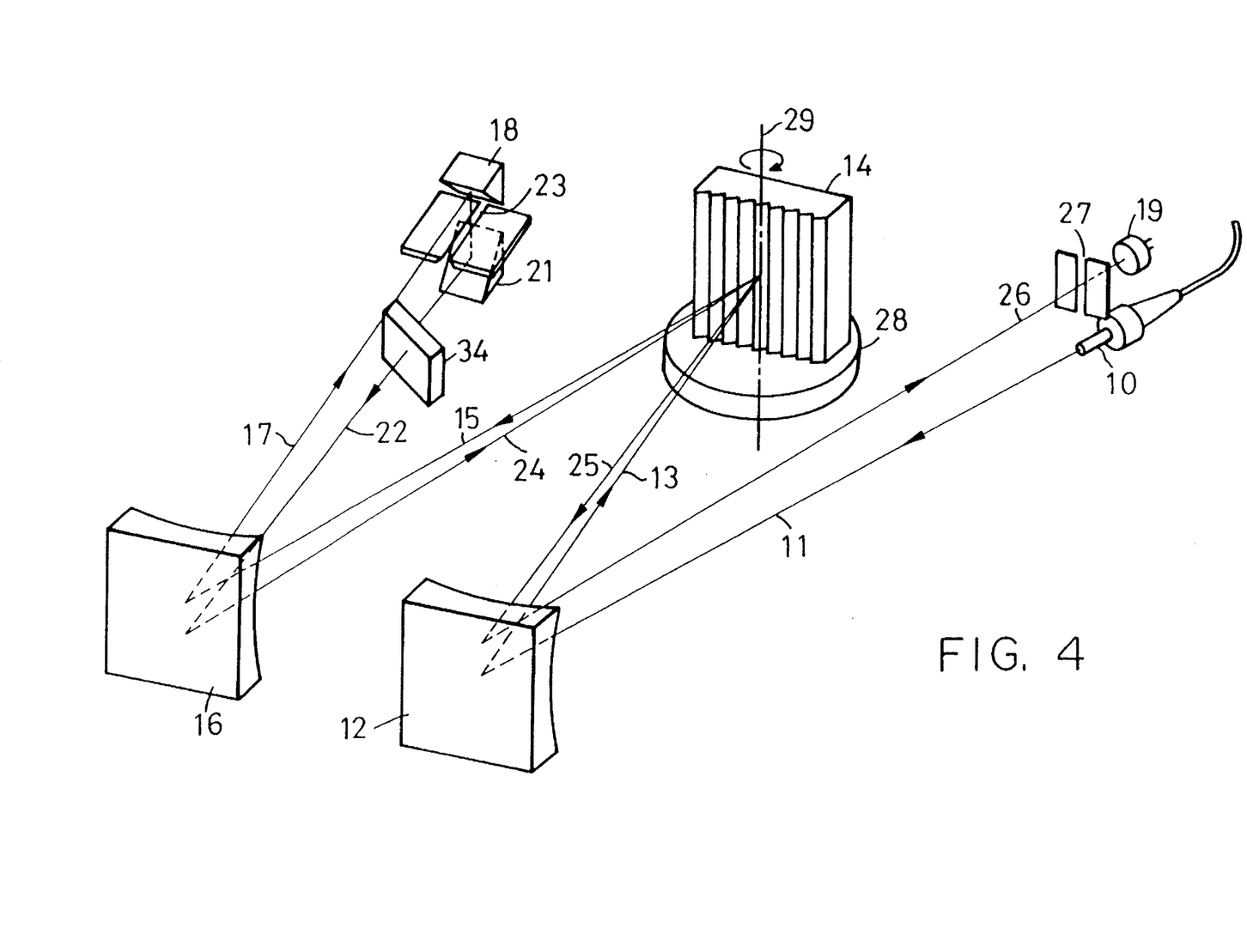
FIG. 4 is a diagrammatic representation of an embodiment according to the second aspect of the present invention.
Figure 5A:
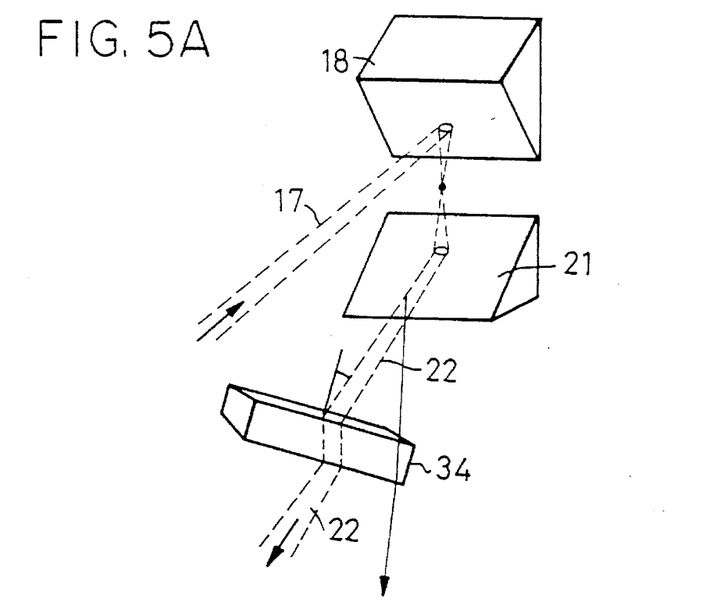
FIG. 5A is an enlarged perspective view showing the principal part in the FIG. 4 embodiment.
Figures 5B, 5C, 5D:
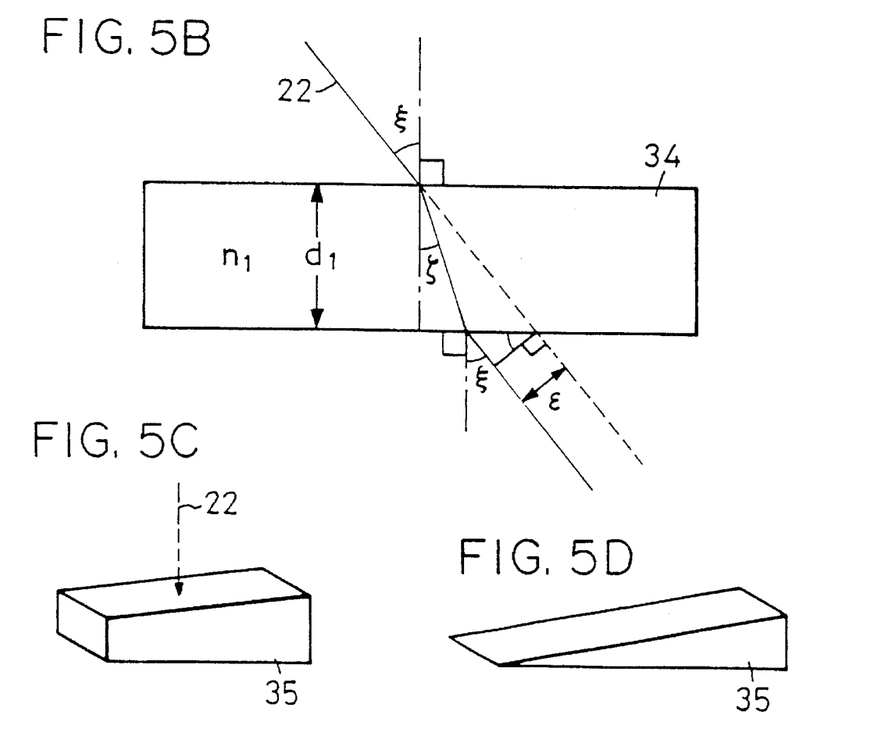

It is also possible to fix the imaging point of the outgoing light 26 by displacing the direction of its travel laterally through use of a symmetric optical element. For example, as shown in FIGS. 4 and 5A, an optical glass element 34 is disposed aslant with respect to the optical axis in the optical path from the reflecting mirror 21 to the second parabolic mirror 16, by which the path of the reflected light 22 from the reflecting mirror 21 is displaced in the X-axis direction. Now, let it be assumed that light 22 is incident on the optical glass 34 of a thickness $d_1$ and a refractive index $n_1$ at an angle $\xi$ thereto as shown in FIG. 5B. Let the angle of refraction in the optical glass 34 be represented by $\zeta$ and the spacing between the direction of emergence of the refracted light from the optical glass plate 34 and the direction of incidence of the light 22 represented by $\epsilon$. By the law of refraction, $n_1 \sin\zeta = \sin\xi$ and $\zeta = \sin^{-1}(\sin(\xi/n_1))$. On the other hand, $\epsilon$ is given by $$\epsilon = d_1(\tan\xi - \tan\zeta)\cos\xi \tag{13}$$

$$= d_1\{\tan\xi - \tan\{\sin^{-1}(\sin(\xi/n_1))\}\}\cos\xi$$

Figure 6A:
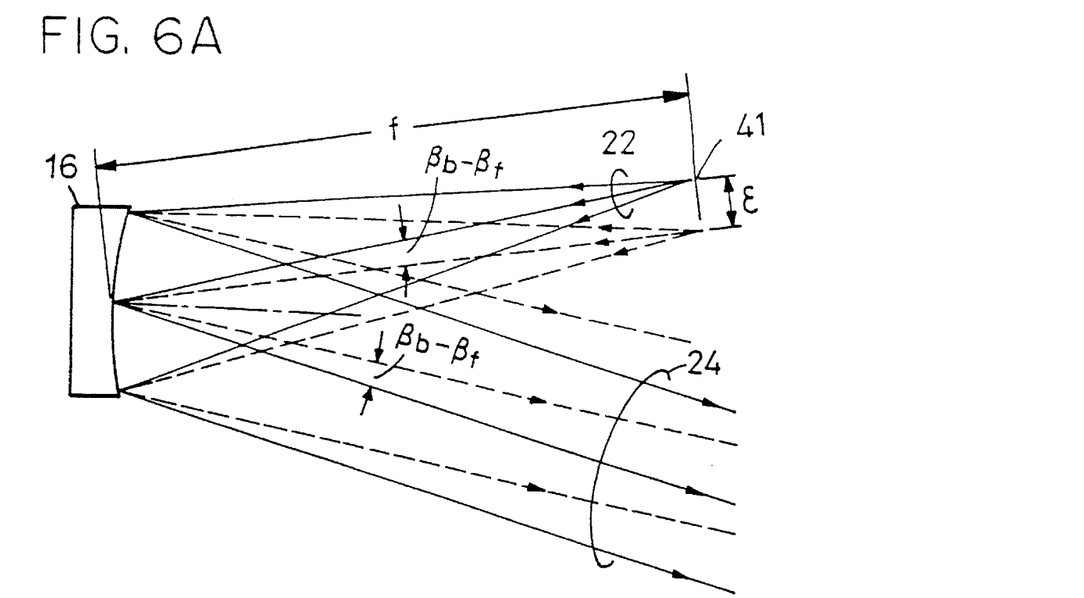
FIG. 6A is a schematic diagram showing the incidence of light on its reflection from a parabolic mirror 16 before and after the insertion of the optical glass in the optical path.
Figure 6B:
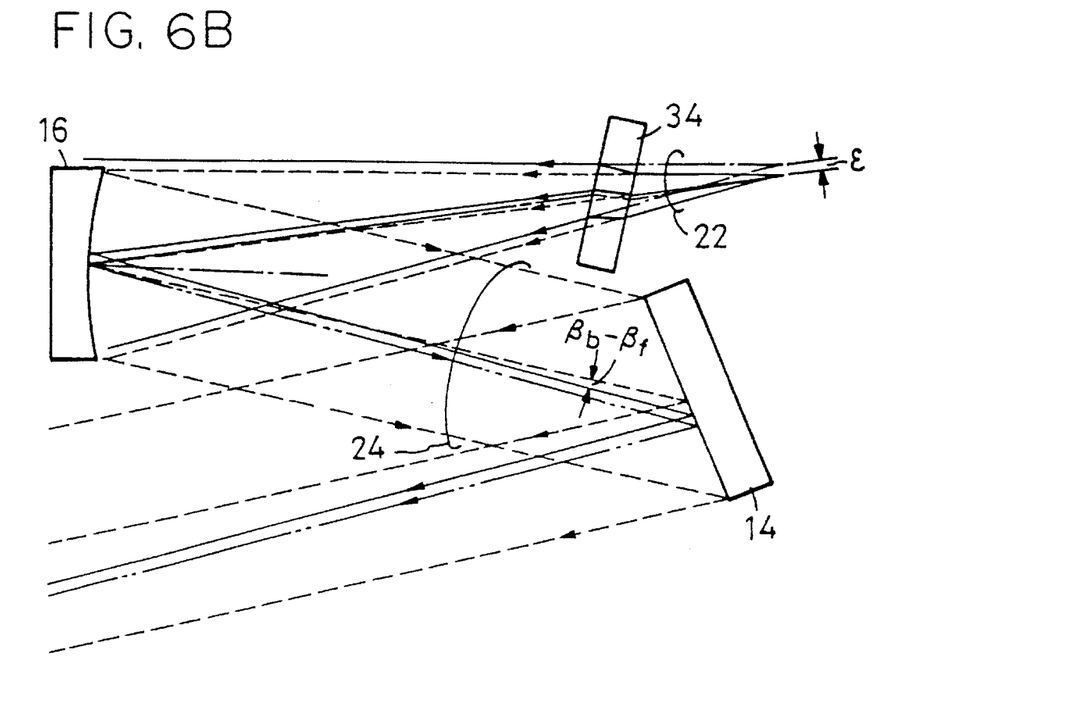
FIG. 6B is a schematic diagram showing how the focus of the parabolic mirror 16 is displaced equivalently by the insertion of the optical glass.

Setting $\gamma_f = 24°$ and $\theta = 1°$, $\beta_f - \beta_b = 0.041°$ from Eq. (12). Letting the focal length of each of the parabolic mirrors 12 and 16 be represented by $f$, the spacing $\epsilon$ needs only to be $\epsilon = f \tan(\beta_b - \beta_f)$ in terms of the relationships shown in FIGS. 6A and 6B; setting $f$ to 250 mm, $\epsilon = 0.18$ mm. Substituting this of $\epsilon$ into Eq. (13) and setting $n_1 = 1.5$/and $d_1 = 2.5$ mm, the angle $\epsilon$ is about 28.2°. That is, the optical glass plate 34 needs only to be disposed aslant in the X-Y plane so that the light 22 incident thereon at an angle of 28.2°. The incidence angle $\xi$ is adjusted in accordance with the thickness $d_1$ of the optical glass plate 34. In FIG. 6 the broken and solid lines show the states of incidence and reflection of the backward light before and after the insertion of the optical glass plate 34 in the optical path or system. With the introduction of the optical glass plate 34, the focal point 41 is equivalently displaced by $\epsilon$.

FIGS. 5C and 5D show optical glass plates 35 of gradually increased thickness. By moving such an optical glass plate in the X-axis direction with its light emergence side disposed perpendicularly to the optical axis, the light 22 can be displaced by a desired amount.

Either of the optical glass plates 34 and 35 may be disposed as well in the optical path from the second parabolic mirror 16 to the reflecting mirror 18. While in the above the present invention has been described as being applied to a Czerny-Turner monochromator, the invention is also applicable to Littrow and other types of monochromators.

Figure 7:
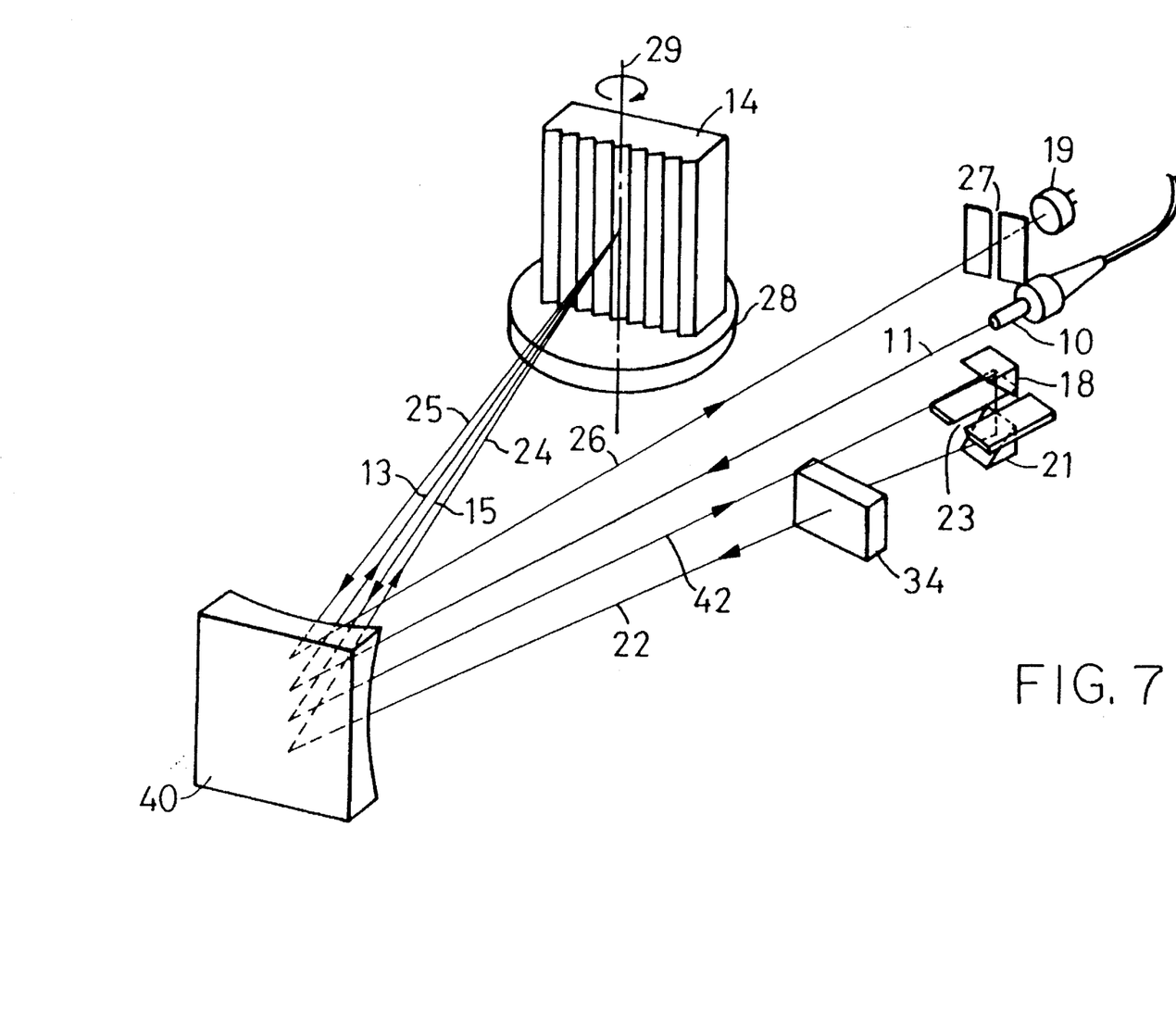
FIG. 7 is a diagram schematically illustrating an embodiment of the present invention to a Littrow double-path monochromator.

For instance, FIG. 7 illustrates an application of the invention to the Littrow monochromator, in which the first and second parabolic mirrors 12 and 16 are substituted with one parabolic mirror 40. In this instance, the incoming light 11 to be measured strikes as the forward collimated light beam 13 on the diffraction grating 14, the forward reflected light 15 therefrom impinges on the parabolic mirror 40 unlike in the case of FIG. 4 and the reflected light 42 from the parabolic mirror 40 is reflected and converged by the reflecting mirror 18; the converged light is bent by the mirror 18 in parallel to the axis of the diffraction grating 14 for incidence on the reflecting mirror 21 via the slit 23 and is reflected by the mirror 21 for incidence on the parabolic mirror 40. The light 22 thus striking on the parabolic mirror 40 is reflected as the backward collimated light beam 24 back to the diffraction grating 14, the backward reflected light 25 therefrom is reflected and converged by the parabolic mirror 40 and the converged light 26 reaches the photodetector 19 via the slit 27. In this instance, the optical glass plate 34 is disposed in either one the forward and backward paths [parabolic mirror 40 —reflecting mirror 18 —reflecting mirror 21 —parabolic mirror 40]; in this embodiment, the optical glass plate 34 is inserted in the optical path between the reflecting mirror 21 and the parabolic mirror 40, by which the direction of travel of the light 22 is displaced by a predetermined value in the main cross-sectional profile perpendicular to the axis of rotation 29 of the diffraction grating 14. This ensures the incidence of light of the desired wavelength on the fixed photodetector 19. Incidentally, the forward collimated light beam 13 to the diffraction grating 14 and the reflected light 15 therefrom are held in the plane perpendicular to the axis of rotation 29 of the grating 14.

Also in the Littrow monochromator using one parabolic mirror, such tapered optical glass plates 35 as shown in FIGS. 5C and 5D may be used; furthermore, as in the FIG. 3 embodiment, either one of the reflecting mirrors 18 and 21 may be disposed at an angle to the other in the main cross-sectional profile to displace the angle of incidence to the parabolic mirror 40.

Figure 8:
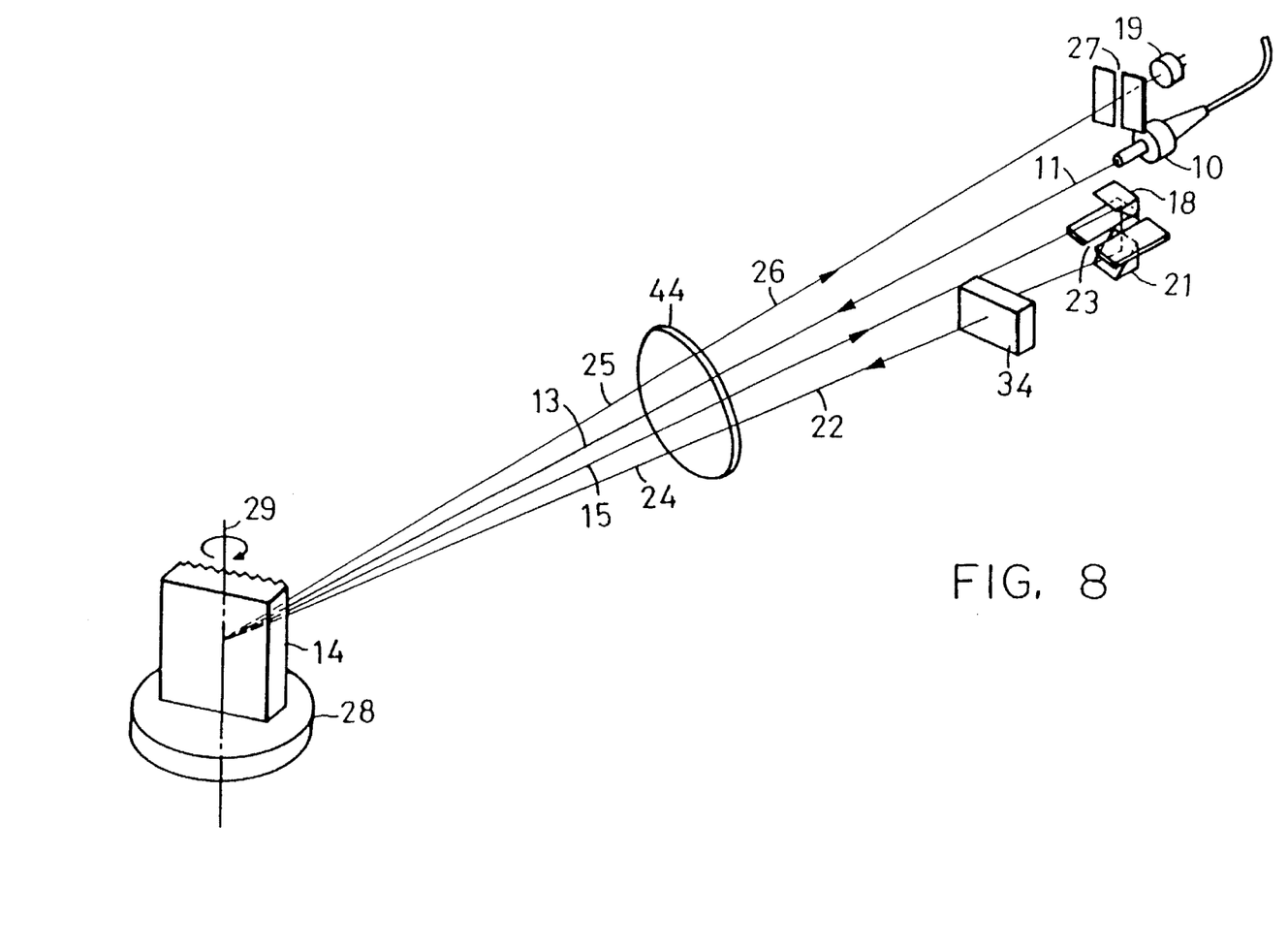
FIG. 8 is a diagram schematically illustrating another embodiment of the present invention to a Littrow double-path monochromator of the type employing a lens.

The present invention be applied as well to a Littrow monochromator of the type employing a collimator lens as a substitute for the parabolic mirror, as illustrated in FIG. 8. The incoming light 11 to be measured is collimated by a collimator lens 44 into the forward collimated light beam 13 for incidence on the diffraction grating 14, the reflected light 15 therefrom is converged by the collimator lens 44 and projected onto the reflecting mirror 18, by which it is reflected substantially in parallel with the axis of rotation 29, the thus reflected light is reflected by the reflecting mirror 21 back to the collimator lens 44, and the reflected light 22 therefrom is incident as the backward collimated light beam 24 on the diffraction grating 14. The backward reflected light 25 from the diffraction grating 14 is converged by the collimator lens 44 and launched therefrom as the light 26 into the photodetector 19. The forward collimated light beam 13 to the diffraction grating 14 and the reflected light 15 therefrom are held in the main cross-sectional profile perpendicular to the axis of rotation 29. In this embodiment, the optical glass plate 34 is shown to be inserted in the optical path between the reflecting mirror 21 and the collimator lens 44, by which the direction of travel of the light 22 is displaced a predetermined value in the main cross-sectional profile perpendicular to the axis of rotation of the diffraction grating 14. As the result of this, the light of the desired wavelength impinges on the fixed photodetector 19 without fail.

Also in this embodiment, such tapered optical glass plates as shown in FIGS. 5C and 5D may be used; alternatively, either one of the reflecting mirrors 18 and 21 may be placed at an angle to the other in the main cross-sectional profile as referred to previously with respect to FIG. 3 embodiment.

As described above, according to the present invention, either one of the reflecting mirrors is disposed at an angle to the other to displace the angle of incidence of backward light on the second parabolic mirror or the optical glass plate is inserted in the optical path to shift in parallel the direction of incidence of the backward light to the second parabolic mirror so that the relationship between the angles of incidence to and reflection from the diffraction grating 14 satisfies Eq. (11) or (12). By this, the imaging point of the reflected light 26 is fixed regardless of the wavelength of the incoming light to be measured; hence, there is no need of using a complicated mechanism for moving the slit 27 and the photodetector 19 in accordance with the wavelength of the incoming light or the angle of rotation of the diffraction grating 14. Thus, the monochromator of the present invention permits relatively easy measurement of wavelength with a high degree of accuracy but can be manufactured at low costs.

It will be apparent that many modifications and variations may be effected without departing from the scope of the novel concepts of the present invention.

What is claimed is:

1. A double-path monochromator comprising:

first parabolic mirror means which reflects incoming light to be measured, as parallel rays of light to a diffraction grating and reflects and converges light reflected from said diffraction grating to a photodetector;

said diffraction grating which is rotatable about a rotation axis parallel to its grating grooves and on which said parallel rays of light from said first parabolic mirror means and parallel rays of light from second parabolic mirror means are incident in a plane perpendicular to said rotation axis;

said second parabolic mirror means which reflects and converges light from said diffraction grating for incidence on a first reflecting mirror and reflects light from a second reflecting mirror for incidence as parallel rays of light on said diffraction grating;

said first reflecting mirror which reflects said light reflected from said second parabolic mirror means in parallel with said rotation axis for incidence on said second reflecting mirror;

said second reflecting mirror which reflects said incident light from said first reflecting mirror back to said second parabolic mirror means; and said photodetector which receives said reflected and converged light from said first parabolic mirror means and converts said received light into an electric signal;

wherein at least one of said first and second reflecting mirrors bends the incident light thereon by a predetermined angle in said plane perpendicular to said rotation axis of said diffraction grating.

2. A double-path monochromator comprising:

first parabolic mirror means which reflects incoming light to be measured, as parallel rays of light, to a diffraction grating and reflects and converges light reflected from said diffraction grating to a photodetector;

said diffraction grating which is rotatable about a rotation axis parallel to its grating grooves and on which said parallel rays of light from said first parabolic mirror means and parallel rays of light from second parabolic mirror means are incident in a plane perpendicular to said rotation axis;

said second parabolic mirror means which reflects and converges light from said diffraction grating for incidence on a first reflecting mirror and reflects light from a second reflecting mirror for incidence as parallel rays of light on said diffraction grating;

said first reflecting mirror which reflects said light reflected from said second parabolic mirror means in parallel with said rotation axis for incidence on said second reflecting mirror;

said second reflecting mirror which reflects said incident light from said first reflecting mirror back to said second parabolic mirror means;

said photodetector which receives said reflected and converged light from said first parabolic mirror means and converts said received light into an electric signal; and an optical glass plate which is inserted in an optical path of light from said second parabolic mirror means via said first reflecting mirror and said second reflecting mirror to said second parabolic mirror means, for displacing the optical path of light by a predetermined distance value in a plane substantially parallel with said plane perpendicular to said rotation axis of said diffraction grating.

3. The double-path monochromator of claim 2, wherein the thickness of said optical glass plate in the direction of the transmission therethrough of light is constant.

4. The double-path monochromator of claim 2, wherein the thickness of said optical glass plate in the direction of the transmission therethrough of light gradually varies and said light is incident obliquely to a plane of said optical glass plate.

5. The double-path monochromator of any one of claims 1 through 4, wherein the differences between the angle of incidence on said diffraction grating from said second parabolic mirror means and the angle of reflection from said diffraction grating to said first parabolic mirror means is constant regardless of the wavelength of said incoming light to be measured.

6. The double-path monochromator of claim 5, wherein said first and second parabolic mirror means is formed by a single parabolic mirror.

7. A double-path monochromator comprising:

a collimator lens which transmits therethrough incoming light to be measured, as forward collimated light beam, to a diffraction grating, transmits therethrough forward reflected light from said diffraction grating for incidence as a converged light beam on a first reflecting mirror, transmits therethrough reflected light from a second reflecting mirror for incidence as backward collimated light beam on said diffraction grating, and transmits therethrough backward reflected light from said diffraction grating for incidence as a converged backward light beam on a photodetector;

said diffraction grating which is rotatable about a rotation axis parallel with its grating grooves and receives and reflects said forward and backward collimated light beams from said collimator lens, respectively;

said first reflecting mirror which receives said converged light beam from said collimator lens and reflects it substantially in parallel with said rotation axis of said diffraction grating for incidence on said second reflecting mirror;

said second reflecting mirror which bends said light from said first reflecting mirror substantially 90° for incidence on said collimator lens;

said photodetector which receives said converged backward light beam and converts it into an electric signal; and an optical glass plate which is inserted in an optical path of light from said collimator lens via said first reflecting mirror and said second reflecting mirror to said collimator lens, for displacing the optical path of light by a predetermined distance value in a plane substantially perpendicular to said rotation axis of said diffraction grating.

8. The double-path monochromator of claim 7, wherein the thickness of said optical glass plate in the direction of the transmission therethrough of light is constant.

9. The double-path monochromator of claim 7, wherein the thickness of said optical glass plate in the direction of the transmission therethrough of light gradually varies.

10. A double-path monochromator comprising:

a collimator lens which transmits therethrough incoming light to be measured, as forward collimated light beam, to a diffraction grating, transmits therethrough forward reflected light from said diffraction grating for incidence as a converged light beam on a first reflecting mirror, transmits therethrough reflected light from a second reflecting mirror for incidence a backward collimated light beam on said diffraction grating, and transmits therethrough backward reflected light from said diffraction grating for incidence as a converged backward light beam on a photodetector;

said diffraction grating which is rotatable about a rotation axis parallel with its grating grooves and receives and reflects said forward and backward collimated light beams from said collimator lens, respectively;

said first reflecting mirror which receives said converged light beam from said collimator lens and reflects it substantially in parallel with said rotation axis of said diffraction grating for incidence on said second reflecting mirror;

said second reflecting mirror which bends said light from said first reflecting mirror substantially 90° for incidence on said collimator lens; and said photodetector which receives said converged backward light beam and converts it into an electric signal;

wherein at least one of said first and second reflecting mirrors bends the incident light thereon by a predetermined angle in a plane substantially perpendicular to said rotation axis of said diffraction grating.

11. The double-path monochromator of any one of claims 7 through 10, wherein the differences between the angle of incidence of said backward collimated light beam from said collimator lens on said diffraction grating and the angle of reflection of said forward collimated light beam from said diffraction grating to said collimator lens is constant regardless of the wavelength of said incoming light to be measured.

* * * * *